(12) United States Patent
Shen (10) Patent No.: US 11,802,076 B2
(45) Date of Patent: Oct. 31, 2023

(54) LEAD-FREE GLASS PASTE, CHIP RESISTOR AND METHOD FOR PRODUCING SAME

(71) Applicant: CHANGXIN MEMORY TECHNOLOGIES, INC., Hefei (CN)

(72) Inventor: Hongkun Shen, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 119 days.

(21) Appl. No.: 17/487,666

(22) Filed: Sep. 28, 2021

(65) Prior Publication Data
US 2022/0024808 A1    Jan. 27, 2022

Related U.S. Application Data

(63) Continuation of application No. PCT/CN2021/098826, filed on Jun. 8, 2021.

(30) Foreign Application Priority Data

Jul. 22, 2020   (CN) .......................... 202010710018.6

(51) Int. Cl.
| | |
|---|---|
| C03C 8/16 | (2006.01) |
| C03C 8/02 | (2006.01) |
| H01C 1/14 | (2006.01) |
| H01C 1/01 | (2006.01) |
| H01C 17/28 | (2006.01) |
| H01C 7/00 | (2006.01) |
| H01C 17/065 | (2006.01) |
| H01C 17/00 | (2006.01) |

(52) U.S. Cl.
CPC ................ *C03C 8/16* (2013.01); *C03C 8/02* (2013.01); *H01C 1/01* (2013.01); *H01C 1/14* (2013.01); *H01C 7/003* (2013.01); *H01C 17/006* (2013.01); *H01C 17/065* (2013.01); *H01C 17/28* (2013.01); *C03C 2204/00* (2013.01); *C03C 2205/00* (2013.01)

(58) Field of Classification Search
CPC .... H01C 17/065; H01C 17/006; H01C 7/003; H01C 1/01; H01C 1/14; C08C 6/16; C08C 6/02
See application file for complete search history.

(56) References Cited

U.S. PATENT DOCUMENTS

| | | | |
|---|---|---|---|
| 9,790,315 B2* | 10/2017 | Kramer | C08G 18/4202 |
| 11,236,193 B2* | 2/2022 | Suen | C08G 18/12 |
| 2017/0240688 A1* | 8/2017 | Kramer | C08L 75/08 |
| 2022/0049045 A1* | 2/2022 | Mennecke | C09J 175/08 |

FOREIGN PATENT DOCUMENTS

| | | |
|---|---|---|
| CN | 104212347 A | 12/2014 |
| CN | 105504823 A | 4/2016 |
| CN | 106941033 A | 7/2017 |

(Continued)

OTHER PUBLICATIONS

CN111057465 machine translation. (Year: 2020).*

(Continued)

*Primary Examiner* — Kyung S Lee
(74) *Attorney, Agent, or Firm* — Cooper Legal Group, LLC (57) ABSTRACT

A lead-free glass paste, a chip resistor and a method for producing the same are provided. The lead-free glass paste includes 6-7 parts by mass of borosilicate oil, 12-21 parts by mass of aluminum oxide powder, 2-3 parts by mass of glass fiber powder, and 0.1-0.5 parts by mass of a curing agent.

16 Claims, 3 Drawing Sheets

(56) References Cited

FOREIGN PATENT DOCUMENTS

| | | |
|---|---|---|
| CN | 206460826 U | 9/2017 |
| CN | 108328928 A | 7/2018 |
| CN | 108864428 A | 11/2018 |
| CN | 109734920 A | 5/2019 |
| CN | 110217992 A | 9/2019 |
| CN | 110467446 A | 11/2019 |
| CN | 111057465 A | 4/2020 |
| TW | 565540 B | 12/2003 |

OTHER PUBLICATIONS

CN108864428 machine translation. (Year: 2018).*

CN206460826 machine translation. (Year: 2017).*

"Preparation and properties of alcohol-soluble silicone resin for ceramic resistor encapsulation adhesive", 2014, Chen Ren, Wang Feng, Hu Jaqing and Tu Weiping, College of Chemistry and Chemical Engineering, South China University of Technology, vol. 23, No. 6, 5 pgs.

"Preparation and characterization of heat-resistant silicone oil containing phenylboronic acid or pyridineboronic acid", Apr. 2019, Xu Weiqiang, A Dissertation Submitted for the Degree of Master,China Academic Journal Electronic Publishing House, 92 pgs.

"Preparation and Characterization of Polyborosiloxanes and Their Blends with Phenolic Resin as Shapeable Ceramic Precursors",2014, Hong-Ying, Jing-Bo Zhao, Hao Li and Tong Zhao, Chinese Journal of Polymer Science, vol. 32, No. 2, 10 pgs.

Second Office Action of the Chinese application No. 202010710018.6, dated Jun. 8, 2022, 20 pgs.

International Search Report in the international application No. PCT/CN2021/098826, dated Sep. 8, 2021, 3 pgs.

\* cited by examiner

LEAD-FREE GLASS PASTE, CHIP RESISTOR AND METHOD FOR PRODUCING SAME

CROSS-REFERENCE TO RELATED APPLICATIONS

This application is a continuation application of International Application No. PCT/CN2021/098826, filed on Jun. 8, 2021, which claims priority to Chinese patent application No. 202010710018.6, filed on Jul. 22, 2020. The disclosures of International Application No. PCT/CN2021/098826 and Chinese patent application No. 202010710018.6 are hereby incorporated by reference in their entireties.

BACKGROUND

In the existing chip resistors, the protective layer is generally made of a glass paste, while the existing glass paste contains a large amount of lead oxide. Although the lead content of a chip resistor manufactured by the glass paste falls within a scope of exemption from regulations, lead in the lead-containing glass paste may cause environmental pollution, and therefore, the industry, customers and regulations are all committed to lead-free chip resistors.

In the prior art, the lead content in a glass paste is reduced or a lead-free glass paste is achieved by replacing lead oxide. However, the existing lead-free glass pastes have the problem of poor high temperature resistance. A large amount of heat is generated when a chip resistor is working, however the existing lead-free glass pastes cannot meet the requirement for the chip resistor.

SUMMARY

The disclosure relates to the technical field of packaging materials, and in particular to a lead-free glass paste, a chip resistor and a method for producing the same.

Embodiments of the disclosure provide a lead-free glass paste, a chip resistor and a method for producing the same.

The disclosure provides a lead-free glass paste, including 6-7 parts by mass of borosilicate oil, 12-21 parts by mass of aluminum oxide powder, 2-3 parts by mass of glass fiber powder, and 0.1-0.5 parts by mass of a curing agent.

The disclosure further provides a method for producing the lead-free glass paste in any embodiment above, including the following operations.

The borosilicate oil is prepared.

The borosilicate oil is uniformly mixed with the aluminum oxide powder and the glass fiber powder to obtain a mixture.

The curing agent is added into the mixture for curing and the cured mixture is crushed to obtain the lead-free glass paste.

The disclosure further provides a chip resistor, including a substrate; a backside electrode located on the lower surface of the substrate; an topside electrode, in which one end is in contact with the backside electrode, another end extends from a side wall of the substrate to an upper surface of the substrate; a barrier layer located on a surface of the topside electrode away from the substrate; an external electrode located on a surface of the barrier layer away from the topside electrode; a resistive layer located on the upper surface of the substrate and on a side of the topside electrode; a first protective layer located on an upper surface of the resistive layer, in which the first protective layer is prepared by the lead-free glass paste of any one of the foregoing embodiments; and a second protective layer, which is located on an upper surface of the first protective layer.

The disclosure further provides a method for producing a chip resistor, including the following operations.

A substrate is provided.

A backside electrode is formed on a lower surface of the substrate.

A topside electrode, a barrier layer and an external electrode are formed, in which one end of the topside electrode is in contact with the backside electrode, and the other end extends from a side wall of the substrate to an upper surface of the substrate; the barrier layer is located on a surface of the topside electrode away from the substrate; and the external electrode is located on a surface of the barrier layer away from the topside electrode.

A resistive layer is formed on the upper surface of the substrate, in which the resistive layer is located on a side of the topside electrode.

A lead-free glass paste is prepared by using the method for producing a lead-free glass paste of any one of the foregoing embodiments.

The upper surface of the resistive layer is coated with the lead-free glass paste to form the first protective layer.

A second protective layer is formed on an upper surface of the first protective layer.

BRIEF DESCRIPTION OF THE DRAWINGS

To describe the technical solution of the embodiments of the disclosure more clearly, the following briefly introduces the accompanying drawings required for describing the embodiments. Apparently, the accompanying drawings in the following description show only some embodiments of the disclosure, and those skilled in the art may also obtain accompanying drawings of other embodiments from these accompanying drawings without creative efforts.

DETAILED DESCRIPTION

In order to facilitate the understanding of the disclosure, the disclosure will be described more fully hereinafter with reference to the accompanying drawings. Embodiments of the disclosure are given in the accompanying drawings. However, the disclosure can be implemented in many different forms, and is not limited to the embodiments described herein. On the contrary, these embodiments are provided so that the understanding of the disclosure of the disclosure will be more thorough and comprehensive.

Unless otherwise defined, meanings of all technical and scientific terms used in this specification are the same as those usually understood by a person skilled in the art to which the disclosure belongs. The terms used in the description of the disclosure are merely used for describing specific embodiments, and are not intended to limit the disclosure.

The term "and/or" in the disclosure includes any one of the listed items, or any or all of combinations of two or more of the listed items.

In a case where "comprise", "have", and "include" described in the specification are used, another part may be added unless "only" and "consisted of" are used. A term of a singular form may include the plural form unless mentioned to the contrary and cannot be understood that its number is one.

The disclosure provides a lead-free glass paste, including, in parts by mass of 6-7 parts of borosilicate oil, 12-21 parts of aluminum oxide powder, 2-3 parts of glass fiber powder and 0.1-0.5 parts of a curing agent.

The lead-free glass paste in the foregoing embodiment is a lead-free glass paste, which not only complies with environmental protection requirements, but also has a good thermal stability, and the heat-resistant temperature reaches 640° C. or more.

In one example, the lead-free glass paste includes, in parts by mass of 6.2-6.8 parts of borosilicate oil, in which, specifically, the content of the borosilicate oil may be 6.2 parts, 6.5 parts or 6.8 parts; 15-18 parts of aluminum oxide powder, in which, specifically, the content of the aluminum oxide powder may be 15 parts, 16 parts, 17 parts or 18 parts; 2.2-2.8 parts of glass fiber powder, in which, specifically, the content of the glass fiber powder may be 2.2 parts, 2.5 parts or 2.8 parts; and 0.2-0.4 parts of a curing agent, in which, specifically, the content of the curing agent may be 0.2 parts, 0.3 parts or 0.4 parts.

In one example, in parts by mass, the borosilicate oil includes: 100-115 parts of a phenyl-containing silicon substance, 13-28 parts of a boron-containing monomer, 50-75 parts of silane, and 60-80 parts of dihydroxypyridine. Specifically, in the borosilicate oil, the content of a silicon-containing substance may be 100 parts, 105 parts, 110 parts or 115 parts; the content of the boron-containing monomer may be 13 parts, 15 parts, 20 parts, 25 parts or 28 parts; the content of silane may be 50 parts, 55 parts, 60 parts, 65 parts, 70 parts or 75 parts; the content of dihydroxypyridine may be 60 parts, 65 parts, 70 parts, 75 parts or 80 parts.

In one example, the phenyl-containing silicon substance includes at least one of ethoxydiphenylsilane, diphenyldimethoxysilane, or diphenylsilanediol. That is, the phenyl-containing silicon substance may include any one of ethoxydiphenylsilane, diphenyldimethoxysilane and diphenylsilanediol, or may be a combination of any two or more of ethoxydiphenylsilane, diphenyldimethoxysilane and diphenylsilanediol.

In one example, silane includes at least one of dichlorodimethylsilane, dichlorodiethylsilane or dichlorodiphenylsilane. That is, silane may be any one of dichlorodimethylsilane, dichlorodiethylsilane and dichlorodiphenylsilane, or may be a combination of any two or more of dichlorodimethylsilane, dichlorodiethylsilane and dichlorodiphenylsilane.

In one example, dihydroxypyridine includes at least one of 2,4-dihydroxypyridine, 2,6-dihydroxypyridine or 3,5-dihydroxypyridine. That is, the dihydroxypyridine may be any one of 2,4-dihydroxypyridine, 2,6-dihydroxypyridine and 3,5-dihydroxypyridine, or may be a combination of any two or more of 2,4-dihydroxypyridine, 2,6-dihydroxypyridine and 3,5-dihydroxypyridine.

In one example, the boron-containing monomer includes at least one of boric acid, phenylboronic acid, tri-isopropyl borate, or dichlorophenylborane. That is, the boron-containing monomer may be any one of boric acid, phenylboronic acid, tri-isopropyl borate and dichlorophenylborane, or may be a combination of any two or more of boric acid, phenylboronic acid, tri-isopropyl borate and dichlorophenylborane.

In one of the examples, the aluminum oxide powder includes at least one of nanoscale aluminum oxide powder, gas-phase aluminum oxide powder or α-type nanoscale aluminum oxide powder. That is, the aluminum oxide powder may be any one of nanoscale aluminum oxide powder, gas-phase aluminum oxide powder and α-type nanoscale aluminum oxide powder, or may be a combination of any two or more of nanoscale aluminum oxide powder, gas-phase aluminum oxide powder and α-type nanoscale aluminum oxide powder.

In one of the examples, the glass fiber powder includes at least one of alkali-free glass fiber powder, alkali-resistant glass fiber powder, high-alkali glass fiber powder, or medium-alkali glass fiber powder. That is, the glass fiber powder may be any one of alkali-free glass fiber powder, alkali-resistant glass fiber powder, high-alkali glass fiber powder and medium-alkali glass fiber powder, or may be a combination of any two or more of alkali-free glass fiber powder, alkali-resistant glass fiber powder, high-alkali glass fiber powder and medium-alkali glass fiber powder.

In one of the examples, the curing agent includes at least one of TMO (tetramethoxysilane), DBPH (2,5-dimethyl-2, 5-di(tert-butylperoxy)hexane), dibutyltin dilaurate, dibutyltin diacetate, or DCP (dicumyl peroxide). That is, the curing agent may be any one of TMO, DBPH, dibutyltin dilaurate, dibutyltin diacetate and DCP, or may be a combination of any two or more of TMO, DBPH, dibutyltin dilaurate, dibutyltin diacetate and DCP.

In one of the examples, a chemical structural formula of the lead-free glass paste is:

in which $x:y=1.1-1.9:0.3-0.7$; $R_1$ is phenyl, hydroxyl or ethanol; $R_2$ is methyl, ethyl or phenyl; and $R_3$ is dihydroxypyridine.

Figure 1:
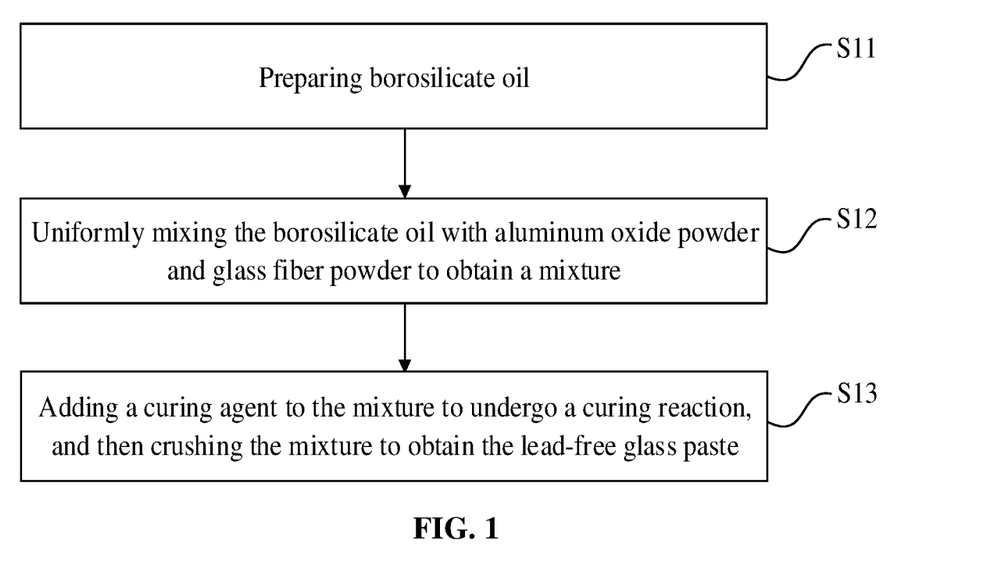
FIG. 1 is a flowchart of a method for producing a lead-free glass paste provided in an embodiment of the disclosure.

In another embodiment, with reference to FIG. 1, the disclosure further provides a method for producing a lead-free glass paste in any embodiments above. The method includes the following operations.

At S11, borosilicate oil is prepared.

At S12, the borosilicate oil is uniformly mixed with aluminum oxide powder and glass fiber powder to obtain a mixture.

At S13, a curing agent is added into the mixture to undergo a curing reaction, and then the obtained product is crushed to obtain the lead-free glass paste.

Figure 2:
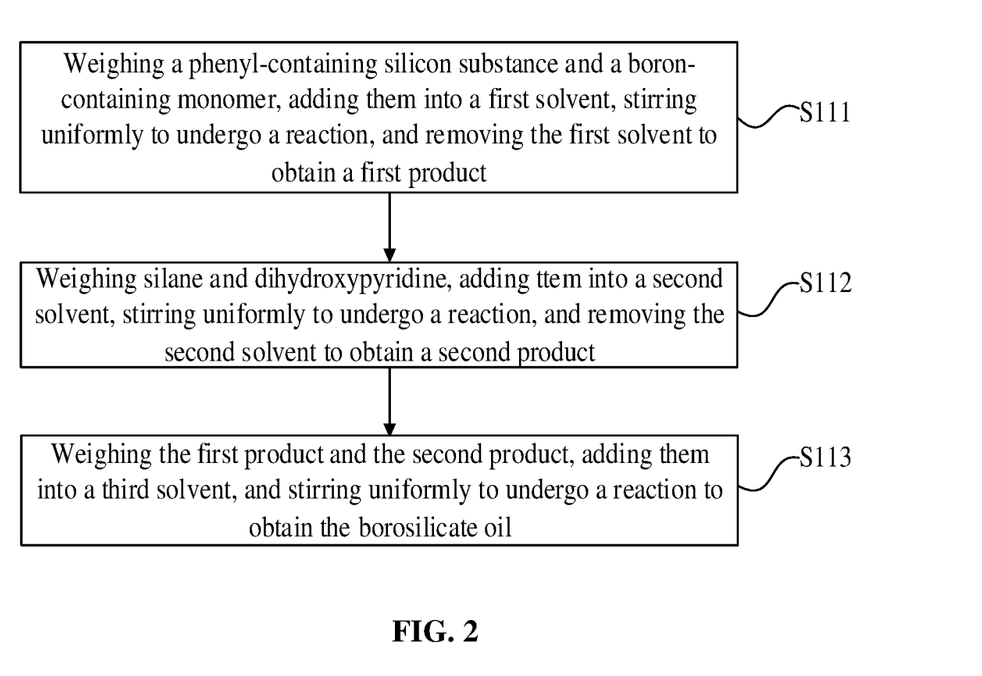
FIG. 2 is a flowchart of preparation of borosilicate oil in the method for producing a lead-free glass paste provided in an embodiment of the disclosure.

In one example, as shown in FIG. 2, S11 includes the following operations.

At S111, the phenyl-containing silicon substance and the boron-containing monomer are weighed, the weighed phenyl-containing silicon substance and boron-containing monomer are added into a first solvent, the mixture is stirred uniformly to undergo a reaction, and then the first solvent is removed to obtain a first product.

At S112, silane and dihydroxypyridine are weighed, the weighed silane and dihydroxypyridine are added into a second solvent, then the mixture is stirred uniformly to undergo a reaction, and then the second solvent is removed to obtain a second product.

At S113, the first product and the second product are weighed, the weighed first product and second product are added into a third solvent, and then the mixture is stirred uniformly to undergo a reaction to obtain the borosilicate oil.

Specifically, at S111, the mass of the weighed phenyl-containing silicon substance may be 100 g to 115 g, for example, may be 100 g, 105 g, 110 g, or 115 g, etc. The mass of the weighed boron-containing monomer may be 13 g to 28 g, for example, may be 13 g, 15 g, 20 g, 25 g, or 28 g, etc. The first solvent includes a dichloroethane solvent. The volume of the first solvent may be 150 ml to 200 ml, for example, may be 150 ml, 160 ml, 170 ml, 180 ml, 190 ml, or 200 ml, etc.

In one example, at S112, the mass of the weighed silane may be 50 g to 75 g, for example, may be 50 g, 55 g, 60 g, 65 g, 70 g, or 75 g, etc. The mass of the weighed dihydroxypyridine may be 60 g to 80 g, for example, may be 60 g, 65 g, 70 g, 75 g, or 80 g, etc. The second solvent includes a propyl acetate solvent. The volume of the second solvent may be 350 ml to 450 ml, for example, may be 350 ml, 400 ml, or 450 ml, etc.

In one example, at S113, the parts by mass of the weighed first product may be 1 to 1.1 parts, for example, may be 1 part, 1.01 parts, 1.05 parts, or 1.1 parts, etc. The parts by mass of the weighed second product may be 0.95 to 1 parts, for example, may be 0.95 parts or 1 part, etc. The third solvent includes acetone. The volume of the third solvent may be 95 ml to 150 ml, for example, may be 95 ml, 100 ml, 110 ml, 120 ml, 130 ml, 140 ml, or 150 ml, etc.

In one example, at S111, after the reaction, the first solvent is removed under a low-pressure (below normal pressure) condition. At S111, the reaction temperature may be 50° C. to 75° C., and the reaction time may be 2.5 h to 3.5 h. Specifically, in this step, the reaction temperature may be 50° C., 60° C., 70° C., or 75° C., etc., and the reaction time may be 2.5 h, 3 h, or 3.5 h, etc.

In one example, at S112, the second solvent is removed under the low-pressure condition. At S112, the reaction temperature may be 60° C. to 90° C., and the reaction time may be 1.5 h to 2.5 h. Specifically, in this step, the reaction temperature may be 60° C., 70° C., 80° C., or 90° C., etc., and the reaction time may be 1.5 h, 2 h, or 2.5 h, etc.

In one example, at S113, a reaction temperature may be 35° C. to 45° C., and a reaction time may be 5.5 h to 6.5 h. Specifically, in this step, the reaction temperature may be 35° C., 40° C., or 45° C., etc., and the reaction time may be 5.5 h, 6 h, or 6.5 h, etc.

In one example, the phenyl-containing silicon substance includes at least one of ethoxydiphenylsilane, diphenyldimethoxysilane or diphenylsilanediol. That is, the phenyl-containing silicon substance may include any one of ethoxydiphenylsilane, diphenyldimethoxysilane and diphenylsilanediol, or may be a combination of any two or more of ethoxydiphenylsilane, diphenyldimethoxysilane and diphenylsilanediol.

In one example, silane includes at least one of dichlorodimethylsilane, dichlorodiethylsilane or dichlorodiphenylsilane. That is, silane may be any one of dichlorodimethylsilane, dichlorodiethylsilane and dichlorodiphenylsilane, or may be a combination of any two or more of dichlorodimethylsilane, dichlorodiethylsilane and dichlorodiphenylsilane.

In one example, dihydroxypyridine includes at least one of 2,4-dihydroxypyridine, 2,6-dihydroxypyridine or 3,5-dihydroxypyridine. That is, dihydroxypyridine may be any one of 2,4-dihydroxypyridine, 2,6-dihydroxypyridine and 3,5-dihydroxypyridine, or may be a combination of any two or more of 2,4-dihydroxypyridine, 2,6-dihydroxypyridine and 3,5-dihydroxypyridine.

In one example, the boron-containing monomer includes at least one of boric acid, phenylboronic acid, tri-isopropyl borate, or dichlorophenylborane. That is, the boron-containing monomer may be any one of boric acid, phenylboronic acid, tri-isopropyl borate and dichlorophenylborane, or may be a combination of any two or more of boric acid, phenylboronic acid, tri-isopropyl borate and dichlorophenylborane.

In one example, at S12, in parts by mass, 6-7 parts of the borosilicate oil prepared at S11, 12-21 parts of the aluminum oxide powder and 2-3 parts of the glass fiber powder are weighed, and then the weighed borosilicate oil, aluminum oxide powder and glass fiber powder are uniformly mixed. Specifically, the parts by mass of the weighed borosilicate oil may be 6 parts, 6.5 parts or 7 parts, the parts by mass of the weighed aluminum oxide powder may be 12 parts, 15 parts, or 21 parts, etc., and the parts by mass of the weighed glass fiber powder may be 2 parts, 2.5 parts, or 3 parts, etc.

In one of the examples, the aluminum oxide powder includes at least one of nanoscale aluminum oxide powder, gas-phase aluminum oxide powder or α-type nanoscale aluminum oxide powder. That is, the aluminum oxide powder may be any one of the nanoscale aluminum oxide powder, the gas-phase aluminum oxide powder and the α-type nanoscale aluminum oxide powder, or may be a combination of any two or more of the nanoscale aluminum oxide powder, the gas-phase aluminum oxide powder and the α-type nanoscale aluminum oxide powder.

In one of the examples, the glass fiber powder includes at least one of alkali-free glass fiber powder, alkali-resistant glass fiber powder, high-alkali glass fiber powder or medium-alkali glass fiber powder. That is, the glass fiber powder may be any one of the alkali-free glass fiber powder, the alkali-resistant glass fiber powder, the high-alkali glass fiber powder and the medium-alkali glass fiber powder, or may be a combination of any two or more of the alkali-free glass fiber powder, the alkali-resistant glass fiber powder, the high-alkali glass fiber powder and the medium-alkali glass fiber powder.

In one example, at S13, the curing agent is added into the mixture obtained at S12, in which the parts by mass of the added curing agent may be 0.1 to 0.5 parts. The mixture is uniformly stirred, bubbles are removed under a low-pressure condition, and the curing reaction is performed at a preset temperature for a certain period of time to obtain a reaction product. Specifically, the parts by mass of the added curing agent may be 0.1 parts, 0.2 parts, 0.3 parts, 0.4 parts or 0.5 parts.

Specifically, the temperature for the curing reaction may be 26° C. to 45° C., for example, 26° C., 30° C., 35° C., 40° C., or 45° C., etc., and the time for the curing reaction may be 5 h to 7 h, for example, 5 h, 6 h or 7 h.

In one example, at S13, the obtained reaction product is crushed by using any crushing process to obtain the lead-free glass paste.

In one of the examples, the curing agent includes at least one of TMO, DBPH, dibutyltin dilaurate, dibutyltin diacetate or DCP. That is, the curing agent may be any one of TMO, DBPH, dibutyltin dilaurate, dibutyltin diacetate and DCP, or may be a combination of any two or more of TMO, DBPH, dibutyltin dilaurate, dibutyltin diacetate and DCP.

The lead-free glass paste prepared in the foregoing embodiments is lead-free, which not only complies with environmental protection requirements, but also has good thermal stability, and the heat-resistant temperature thereof reaches 640° C. or more.

The method for producing the lead-free glass paste in the disclosure is further described with the following specific examples.

Example 1

At step 1, 26 g of dichlorophenylborane was added into a beaker and dissolved in 200 mL of dichloroethane. After being dissolved, the mixture was added into a 500 mL four-neck flask. Then, 100 g of diphenyldiethoxysilane was added, nitrogen was introduced, the temperature was raised to 55° C. at the nitrogen atmosphere, and a mechanical stirring was performed with a rotation rate of 500 rpm. After the reaction last for 3 h under stirring, the pressure was reduced until the gage pressure on a vacuum pump was −0.05 MPa to remove the solvent and obtain the first product A. 70 g of dichlorodimethylsilane was weighed and dissolved in 400 mL of propyl acetate. After being dissolved, the mixture was added into a 1000 mL four-neck flask. Then, 75 g of 2,6-dihydroxypyridine was added. Nitrogen was introduced. The temperature was raised to 66° C. at the nitrogen atmosphere, and a mechanical stirring was performed with a rotation rate of 500 rpm. After the reaction last for 2 h under stirring, the pressure was reduced until the gage pressure on a vacuum pump was −0.05 MPa. Then, the solvent was removed to obtain a second product B. In 100 mL of acetone, 1.01 parts of the first product A and 1 part of the second product B were dissolved. After that, the mixture was added into a 250 mL four-neck flask and underwent a reaction for 6 h at a temperature of 40° C. to obtain special borosilicate oil.

At step 2, 6.2 parts of the borosilicate oil were weighed, and then 16 parts of the α-type nanoscale aluminum oxide powder and alkali-free glass fiber powder were respectively added to the borosilicate oil, and mixed to obtain a mixture.

At step 3, the curing agent, DBPH was added into the obtained mixture, stirred uniformly, and then bubbles were removed under a low-pressure condition. Then the mixture underwent a reaction for 6 h at a temperature of 35° C. to obtain a product. The product was crushed with a crushing machine to obtain a glass paste. The heat resistance temperature of the glass paste prepared in Example 1 is 689° C.

Figure 3:
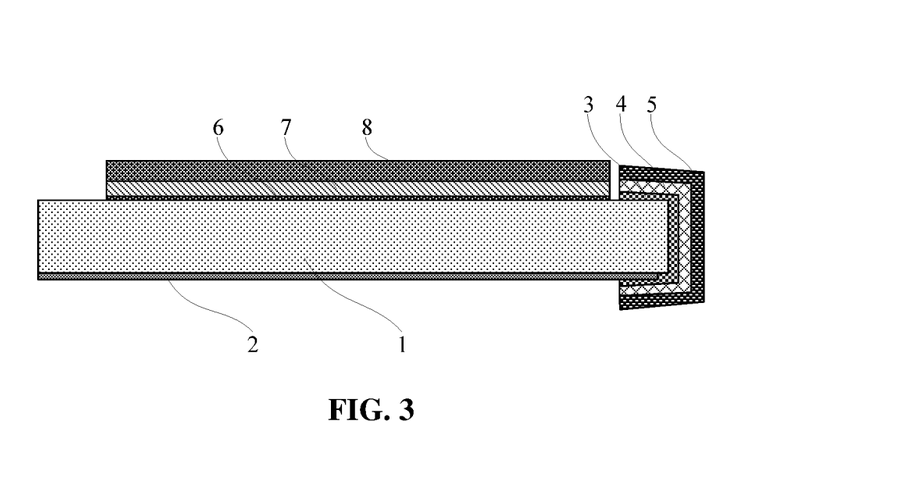
FIG. 3 is a schematic structural diagram of a cross section of a chip resistor provided in an embodiment of the disclosure.

In yet another example, with reference to FIG. 3, the disclosure further provides a chip resistor, including a substrate 1; a backside electrode 2 located on the lower surface of the substrate 1; an topside electrode 3, in which one end is in contact with the backside electrode 2, and the other end is extended from a side wall of the substrate 1 to the upper surface of the substrate 1; a barrier layer 4 located on a surface of the topside electrode 3 away from the substrate 1; an external electrode 5 located on a surface of the barrier layer 4 away from the topside electrode 3; a resistive layer 6 located on the upper surface of the substrate 1 and located on a side of the topside electrode 3; a first protective layer 7 located on the upper surface of the resistive layer 6, in which the first protective layer 7 is prepared by the lead-free glass paste of any one of the foregoing examples (the specific components and features of the lead-free glass paste are omitted herein, and reference can be made to the above examples); and a second protective layer 8, located on the upper surface of the first protective layer 7.

In the chip resistor in the above embodiments, the first protective layer 7 is prepared by the lead-free glass paste of any one of the foregoing embodiments, which not only complies with environmental protection requirements, but also has a good thermal stability, and the heat-resistant temperature is 640° C. or more.

In one example, the substrate 1 may include but is not limited to an aluminum oxide substrate. The backside electrode 2 may include but is not limited to a silver electrode. The topside electrode 3 may include but is not limited to a silver electrode, a palladium electrode, or a mixed electrode of silver and palladium. The barrier layer 4 may include but is not limited to a nickel layer. The external electrode 5 may include but is not limited to a tin electrode. The resistive layer 6 may include but is not limited to a ruthenium oxide layer. The second protective layer 8 may include but is not limited to an epoxy resin layer.

In one example, the ends of the topside electrode 3, the barrier layer 4, and the external electrode 5 extending to the upper surface of the substrate 1 may be in contact with a side wall of a stacked structure formed by the resistive layer 6, the first protective layer 7, and the second protective layer 8.

Figure 4:
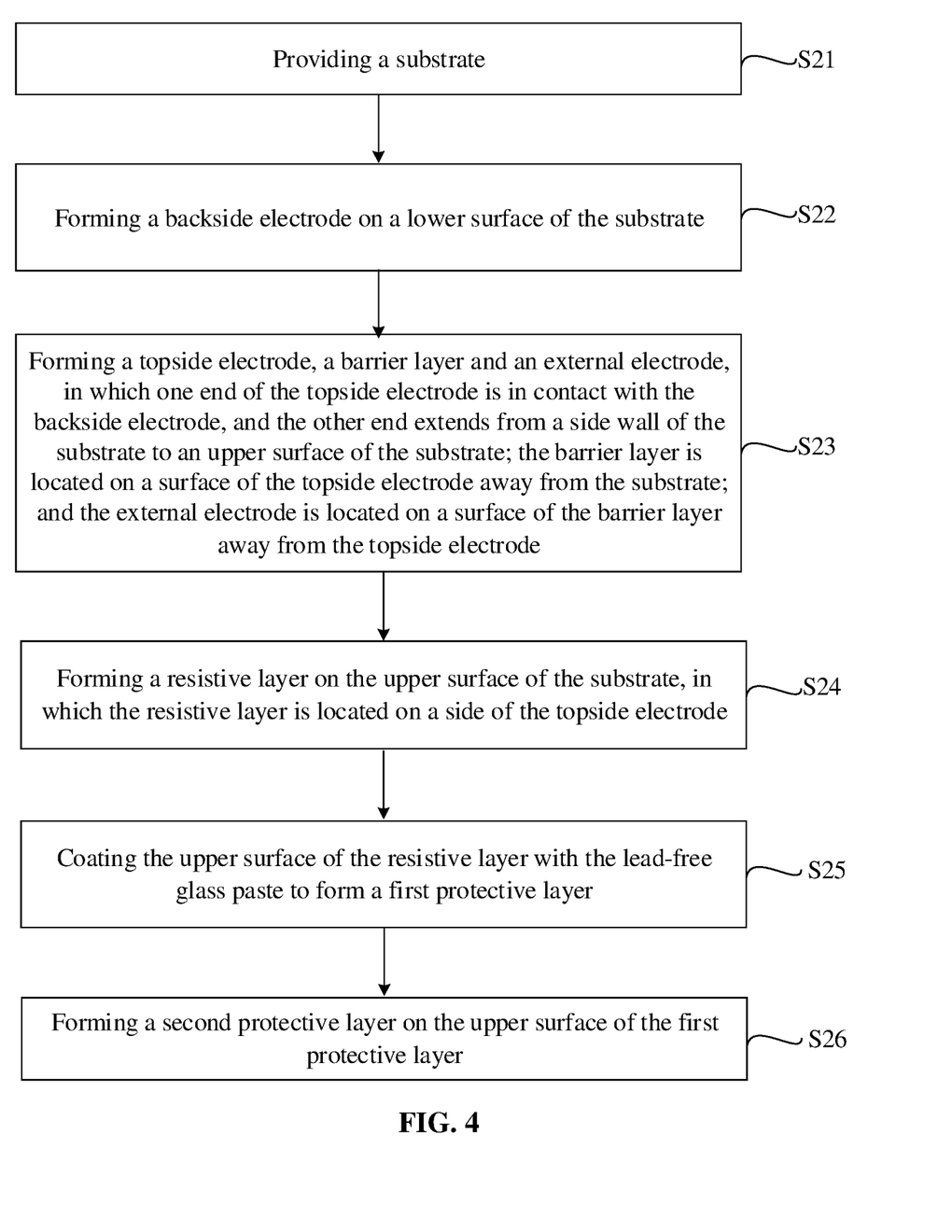
FIG. 4 is a flowchart of a method for producing a chip resistor provided in an embodiment of the disclosure.

In yet another embodiment, with reference to FIG. 3 and FIG. 4, the disclosure further provides a method for producing a chip resistor, including the following operations.

At S21, a substrate is provided.

At S22, a backside electrode is formed on the lower surface of the substrate.

At S23, a topside electrode, a barrier layer and an external electrode are formed, in which one end of the topside electrode is in contact with the backside electrode, and the other end extends from a side wall of the substrate to the upper surface of the substrate; the barrier layer is located on a surface of the topside electrode away from the substrate; and the external electrode is located on a surface of the barrier layer away from the topside electrode.

At S24, a resistive layer is formed on the upper surface of the substrate, where the resistive layer is located on a side of the topside electrode.

At S25, the lead-free glass paste is prepared by using the production method for the lead-free glass paste of any one of the foregoing examples.

At S26, the upper surface of the resistive layer is coated with the lead-free glass paste to form a first protective layer.

At S27, a second protective layer is formed on the upper surface of the first protective layer.

In the method for producing the chip resistor in the foregoing example, the first protective layer is prepared by the lead-free glass paste prepared with the method for producing a lead-free glass paste of any one of the foregoing examples, which not only complies with environmental protection requirements, but also has a good thermal stability, and has a heat-resistant temperature of 640° C. or more.

In one example, the substrate 1 provided at S21 may include but is not limited to an aluminum oxide substrate.

In one example, at S22, the backside electrode 2 may be formed by using, but not limited to, a deposition process or an electroplating process. The backside electrode 2 may include but is not limited to a silver electrode.

In one example, step S23 may include the following steps.

At S231, a topside electrode material layer is formed on the upper surface and a side wall of the substrate 1 and a surface of the backside electrode 2. Specifically, the topside electrode material layer may be formed by using, but not limited to, a deposition process or an electroplating process.

At S232, a barrier material layer is formed on a surface of the topside electrode material layer. Specifically, the barrier material layer may be formed by using a deposition process or an electroplating process, but not limited thereto.

At S233, an external electrode material layer is formed on a surface of the barrier material layer. Specifically, the external electrode material layer may be formed by using a deposition process or an electroplating process, but not limited thereto.

At S234, the topside electrode material layer, the barrier material layer, and the external electrode material layer are etched to form the topside electrode, the barrier layer, and the external electrode.

In one example, the topside electrode 3 may include but is not limited to a silver electrode, a palladium electrode, or a mixed electrode of silver and palladium. The barrier layer 4 may include but is not limited to a nickel layer. The external electrode 5 may include but is not limited to a tin electrode.

In one example, at S24, the resistive layer 6 may be formed by using a deposition process, but not limited thereto. One end of the resistive layer 6 may be in contact with the ends of the topside electrode, the barrier layer and the external electrode extending to the upper surface of the substrate 1. The resistive layer 6 may include a ruthenium oxide layer, but is not limited thereto.

In one example, the second protective layer 8 may be formed by using a spin coating process, but not limited thereto. The second protective layer 8 may include but is not limited to an epoxy resin layer.

The technical features of the foregoing embodiments may be combined arbitrarily. To make description concise, not all possible combinations of the technical features are described in the foregoing embodiments. As long as there is no contradiction in the combinations of these technical features, all the possible combinations shall be considered as falling within the scope recorded by this specification.

The foregoing embodiments only describe several implementations of the disclosure specifically and in detail, but cannot be construed as a limitation to the scope of this application. It is to be noted that for a person of ordinary skill in the art, several transformations and improvements can be made without departing from the concept of the disclosure. These transformations and improvements belong to the protection scope of this application. Therefore, the protection scope of the patent application is defined by the appended claims.

The invention claimed is:

1. A lead-free glass paste, comprising 6-7 parts by mass of borosilicate oil, 12-21 parts by mass of aluminum oxide powder, 2-3 parts by mass of glass fiber powder, and 0.1-0.5 parts by mass of a curing agent,
wherein the borosilicate oil comprises 100-115 parts by mass of a phenyl-containing silicon substance, 13-28 parts by mass of a boron-containing monomer, 50-75 parts by mass of silane, and 60-80 parts by mass of dihydroxypyridine.

2. The lead-free glass paste of claim 1, wherein the phenyl-containing silicon substance comprises at least one of ethoxydiphenylsilane, diphenyldimethoxysilane or diphenylsilanediol; the silane comprises at least one of dichlorodimethylsilane, dichlorodiethylsilane or dichlorodiphenylsilane; the dihydroxypyridine comprises at least one of 2,4-dihydroxypyridine 2,6-dihydroxypyridine or 3,5-dihydroxypyridine; the boron-containing monomer comprises at least one of boric acid, phenylboronic acid, tri-isopropyl borate or dichlorophenylborane.

3. The lead-free glass paste of claim 1, wherein the aluminum oxide powder comprises at least one of nanoscale aluminum oxide powder, gas-phase aluminum oxide powder or α-type nanoscale aluminum oxide powder.

4. The lead-free glass paste of claim 1, wherein the glass fiber powder comprises at least one of alkali-free glass fiber powder, alkali-resistant glass fiber powder, high-alkali glass fiber powder or medium-alkali glass fiber powder.

5. The lead-free glass paste of claim 1, wherein the curing agent comprises at least one of tetramethoxysilane (TMO), 2,5-dimethyl-2,5-di(tert-butylperoxy)hexane (DBPH), dibutyltin dilaurate, dibutyltin diacetate, or dicumyl peroxide (DCP).

6. The lead-free glass paste of claim 1, wherein the lead-five glass paste is represented by the chemical structural formula below:

wherein x:y=1.1-1.9: 0.3-0.7; $R_1$ is phenyl, hydroxyl, or ethanol; $R_2$ is methyl, ethyl, or phenyl; and $R_3$ is dihydroxypyridine.

7. A method for producing a lead-free glass paste, wherein the lead-free glass paste comprises 6-7 parts by mass of borosilicate oil, 12-21 parts by mass of aluminum oxide powder, 2-3 parts by mass of glass fiber powder, and 0.1-0.5 parts by mass of a curing agent, and wherein the method comprises:
preparing the borosilicate oil;
uniformly mixing the borosilicate oil with the aluminum oxide powder and the glass fiber powder to obtain a mixture; and
adding the curing agent to the mixture to undergo a curing reaction, and then crushing to obtain the lead-free glass paste.

8. The method for producing a lead-free glass paste of claim 7, wherein preparing the borosilicate oil comprises:
weighing a phenyl-containing silicon substance and a boron-containing monomer, adding the weighed phenyl-containing silicon substance and boron-containing monomer to a first solvent, stirring for uniformity to undergo a first reaction, and then removing the first solvent to obtain a first product;
weighing silane and dihydroxypyridine, adding the weighed silane and dihydroxypyridine to a second solvent, stirring for uniformity to undergo a second reaction, and then removing the second solvent to obtain a second product; and
weighing the first product and the second product, adding the weighed first product and second product to a third solvent, and stirring for uniformity to undergo a third reaction to obtain the borosilicate oil.

9. The method for producing a lead-free glass paste of claim 8, wherein a mass of the weighed phenyl-containing silicon substance is 100 g to 115 g, a mass of the weighed boron-containing monomer is 13 g to 28 g, a volume of the first solvent is 150 mL to 250 mL, the first solvent comprises a dichloroethane solvent, a mass of the weighed silane is 50 g to 75 g, a mass of the weighed dihydroxypyridine is 60 g to 80 g, a volume of the second solvent is 350 mL to 450 mL, the second solvent comprises propyl acetate, the weighed first product is 1 to 1.1 parts by mass, the weighed second product is 0.95 to 1 parts by mass, a volume of the third solvent is 95 mL to 150 mL, and the third solvent comprises acetone.

10. The method for producing a lead-free glass paste of claim 8, wherein;
in a process of obtaining the first product, a reaction temperature is 50° C. to 75° C., and a reaction time is 2.5 h to 3.5 h;
in a process of obtaining the second product, a reaction temperature is 60° C. to 90° C. and a reaction time is 1.5 h to 2.5 h; and
in a process of obtaining the borosilicate oil, a reaction temperature is 35° C. to 45° C. and a reaction time is 5.5 h to 6.5 h.

11. The method for producing a lead-free glass paste of claim 7, wherein a temperature of the curing reaction is 26° C. to 45° C. and a time for the curing reaction is 5 h to 7 h.

12. A chip resistor, comprising:
a substrate;
a backside electrode, located on a lower surface of the substrate;
a topside electrode, having one end in contact with the backside electrode, another end extending from a side wall of the substrate to an upper surface of the substrate;
a barrier layer, located on a surface of the topside electrode away from the substrate;
an external electrode, located on a surface of the barrier layer away from the topside electrode;
a resistive layer, located on the upper surface of the substrate and located on a side of the topside electrode;
a first protective layer, located on an upper surface of the resistive layer, wherein the first protective layer is prepared by the lead-free glass paste of claim 1; and
a second protective layer, located on an upper surface of the first protective layer.

13. The chip resistor of claim 12, wherein the lead-free glass paste is represented by the chemical structural formula below:

wherein x:y=1.1-1.9: 0.3-0.7: $R_1$ is phenyl, hydroxyl, or ethanol; $R_2$ is methyl, ethyl, or phenyl; and $R_3$ is dihydroxypyridine.

14. A method for producing a chip resistor, comprising:
providing a substrate;
forming a backside electrode on a lower surface of the substrate;
forming a topside electrode, a barrier layer and an external electrode, wherein one end of the topside electrode is in contact with the backside electrode, and another end extends from a side wall of the substrate ti an upper surface of the substrate; the barrier layer is located on a surface of the topside electrode away from the substrate; and the external electrode is located on a surface of the barrier layer away from the topside electrode;
forming a resistive layer on the upper surface of the substrate, wherein the resistive layer is located on a side of the topside electrode;
preparing a lead-free glass paste;
coating an upper surface of the resistive layer with the lead-free glass paste to form a first protective layer; and
forming a second protective layer on an upper surface of the first protective layer,
wherein the lead-free glass paste comprises 6-7 parts by mass of borosilicate oil, 12-21 parts by mass of aluminum oxide powder, 2-3 parts by mass of glass fiber powder and 0.1-0.5 part by mass of a curing agent, and
wherein the lead-free glass paste is produced by a method comprising:
preparing the borosilicate oil;
uniformly mixing the borosilicate oil with the aluminum oxide powder and the glass fiber powder to obtain a mixture; and
adding the curing agent to the mixture to undergo a curing reaction, and then crushing to obtain the lead-free glass paste.

15. The method for producing a chip resistor of claim 14, wherein preparing the borosilicate oil comprises:
weighing a phenyl-containing silicon substance and a boron-containing monomer, adding the weighed phenyl-containing silicon substance and boron-containing monomer to a first solvent, stirring for uniformity to undergo a first reaction, and then removing the first solvent to obtain a first product;
weighing silane and dihydroxypyridine, adding the weighed silane and dihydroxypyridine to a second solvent, stirring for uniformity to undergo a second reaction, and then removing the second solvent to obtain a second product; and
weighing the first product and the second product, adding the weighed first product and second product to a third solvent, and stirring for uniformity to undergo a third reaction to obtain the borosilicate oil.

16. The method for producing a chip resistor of claim 15, wherein;
in a process of obtaining the first product, a reaction temperature is 50° C. to 75° C., and a reaction time is 2.5 h to 3.5 h;
in a process of obtaining the second product, a reaction temperature is 60° C. to 90° C., and a reaction time is 1.5 h to 2.5 h; and
in a process of obtaining the borosilicate oil, a reaction temperature is 35° C. to 45° C. and a reaction time is 5.5 h to 6.5 h.

* * * * *